US007794187B2

(12) United States Patent
Ditch

(10) Patent No.: US 7,794,187 B2
(45) Date of Patent: Sep. 14, 2010

(54) VEHICULAR WHEELCHAIR DOCKING AND CAPTURE APPARATUS

(75) Inventor: James A. Ditch, San Pedro, CA (US)

(73) Assignee: M & M, Inc., Boulder, CO (US)

( * ) Notice: Subject to any disclaimer, the term of this patent is extended or adjusted under 35 U.S.C. 154(b) by 129 days.

(21) Appl. No.: 12/202,943

(22) Filed: Sep. 2, 2008

(65) Prior Publication Data

US 2008/0315548 A1 Dec. 25, 2008

Related U.S. Application Data

(62) Division of application No. 11/037,603, filed on Jan. 18, 2005, now Pat. No. 7,425,110.

(51) Int. Cl.
*B60P 7/08* (2006.01)

(52) U.S. Cl. ...................... 410/9; 410/7; 410/8; 410/19

(58) Field of Classification Search ................. 410/7–9, 410/19, 30; 296/65.04; 297/DIG. 4; 280/304.1; 248/503, 503.1; 254/2 C
See application file for complete search history.

(56) References Cited

U.S. PATENT DOCUMENTS

| | | | | |
|---|---|---|---|---|
| 3,752,265 | A | 8/1973 | Lyder | |
| 4,265,478 | A | 5/1981 | Korsgaard | |
| 5,388,937 | A | 2/1995 | Farsai | |
| 5,888,038 | A | 3/1999 | Ditch et al. | |
| 6,113,325 | A | 9/2000 | Craft | |
| 6,231,283 | B1 * | 5/2001 | Stowers | 410/9 |
| 6,352,396 | B1 | 3/2002 | Budd et al. | |
| 6,386,614 | B1 | 5/2002 | Logan | |
| 6,428,254 | B2 | 8/2002 | Craft | |
| 6,471,454 | B1 | 10/2002 | Koller | |
| 6,474,916 | B2 | 11/2002 | Constantin | |
| 6,524,039 | B1 | 2/2003 | Magnuson et al. | |
| 6,575,677 | B2 | 6/2003 | Craft | |
| 6,685,403 | B2 | 2/2004 | Constantin | |
| 6,776,564 | B1 | 8/2004 | Kiernan et al. | |
| 7,425,110 | B2 * | 9/2008 | Ditch | 410/9 |
| 2004/0005203 | A1 | 1/2004 | Craft | |

* cited by examiner

*Primary Examiner*—Stephen Gordon
(74) *Attorney, Agent, or Firm*—Fulwider Patton LLP

(57) ABSTRACT

A transit vehicle docking system including a pair of press plates driven inwardly against the opposite side of a wheelchair docked in a docking space in a transit vehicle.

7 Claims, 11 Drawing Sheets

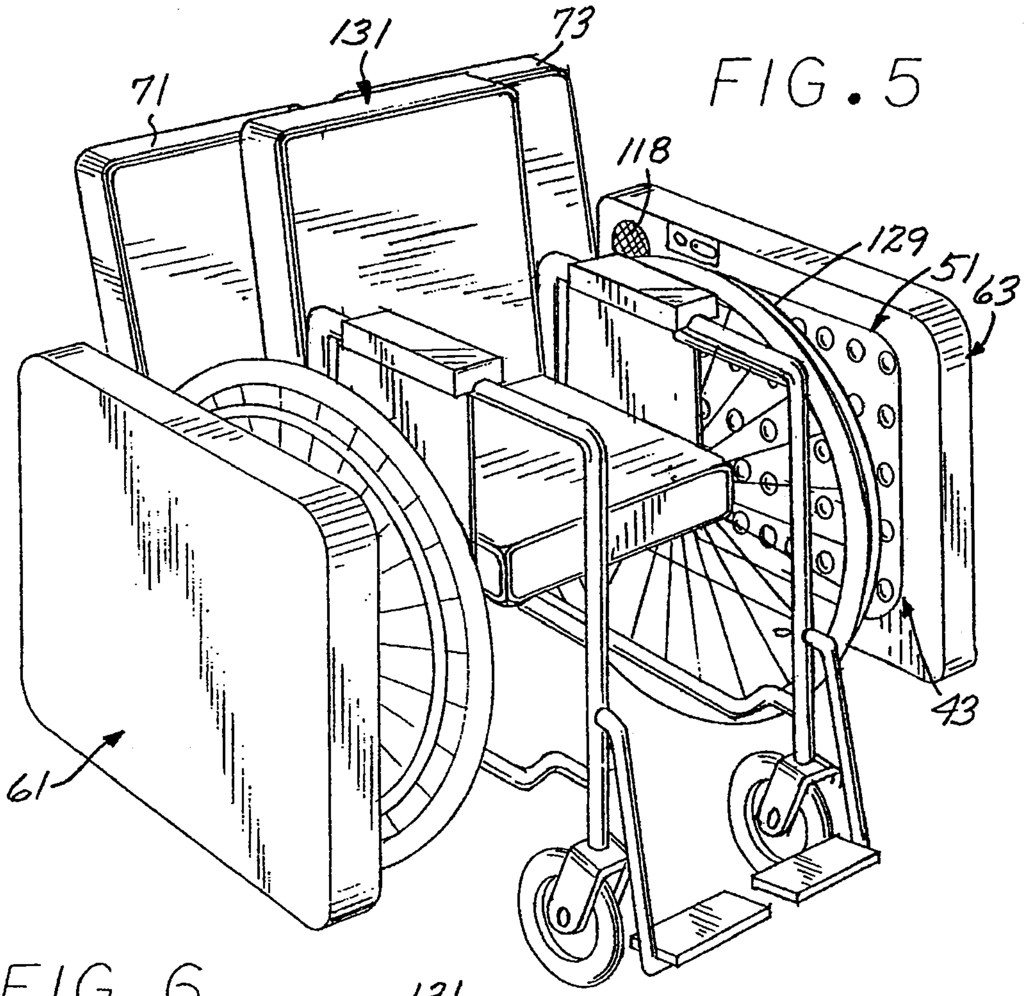
FIG. 5
FIG. 6
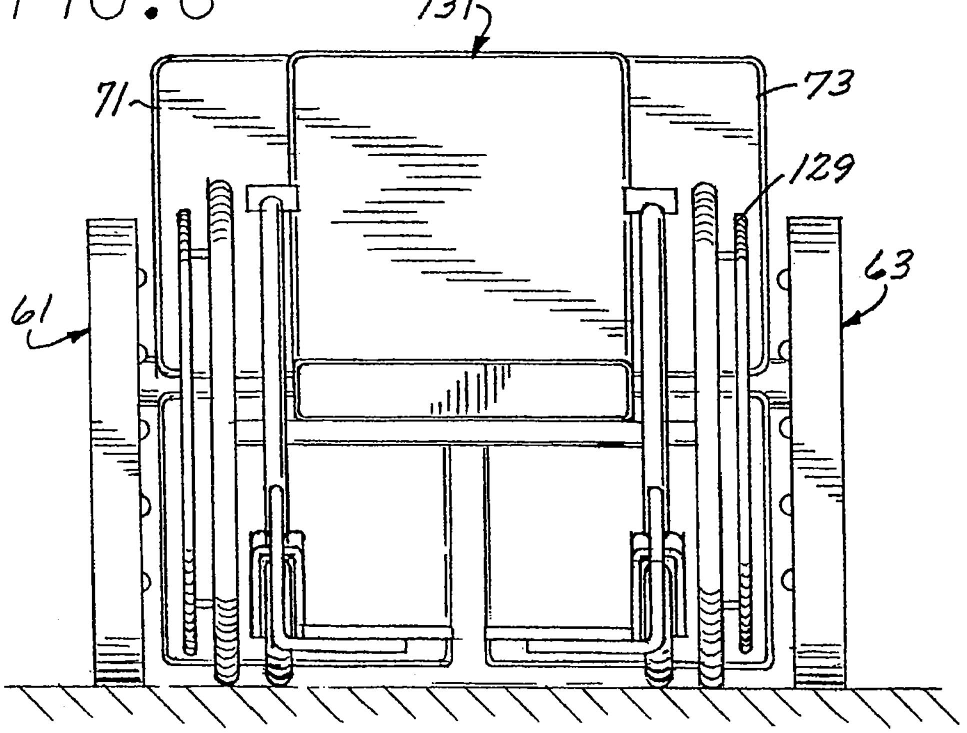

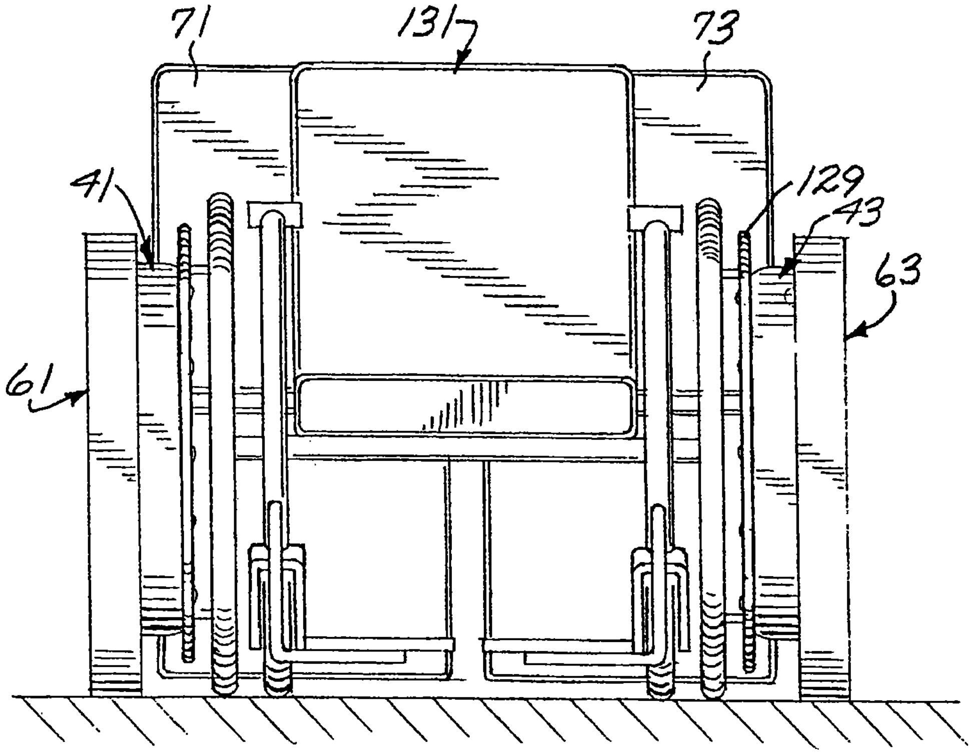
FIG. 7
FIG. 8
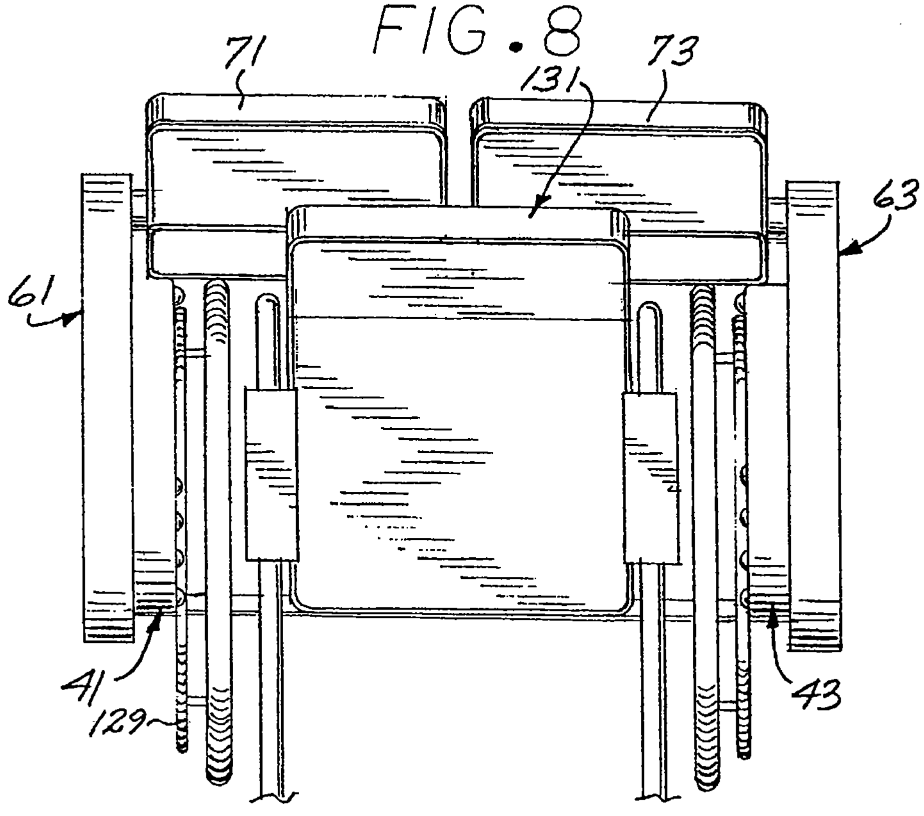

FIG. 12
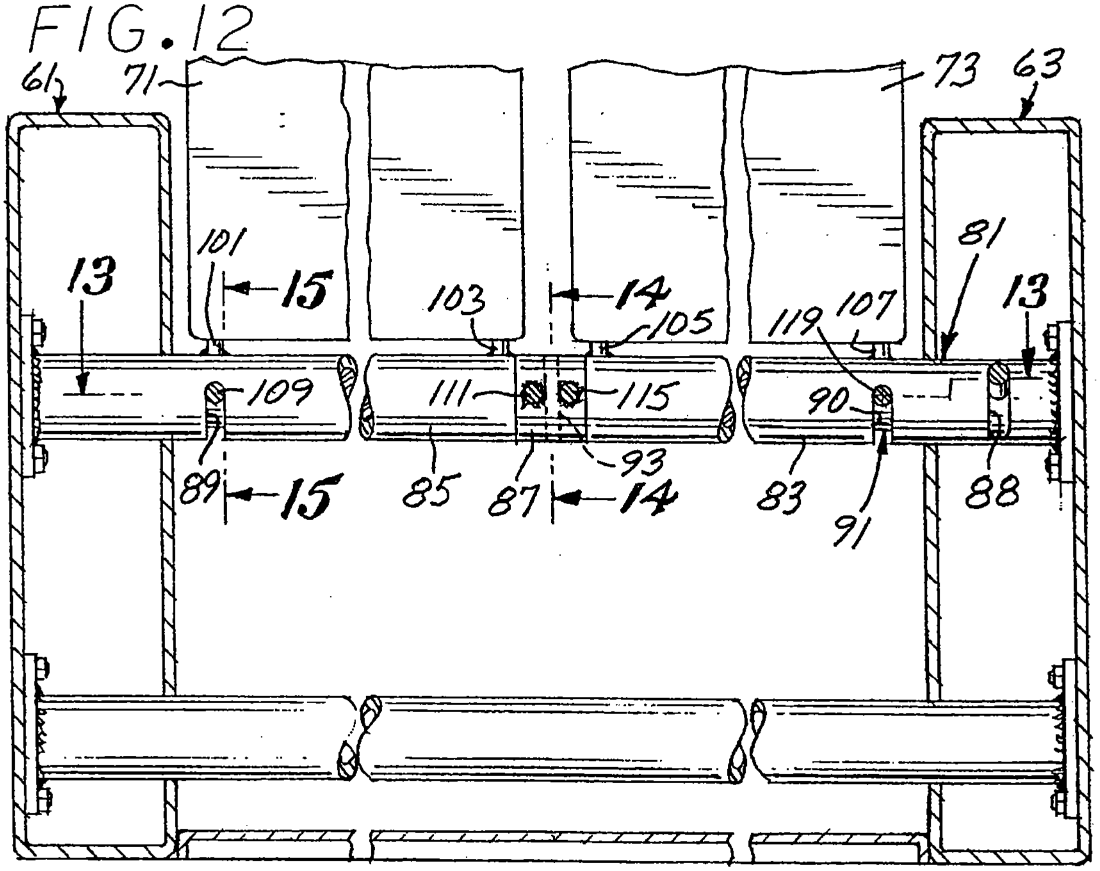
FIG. 13
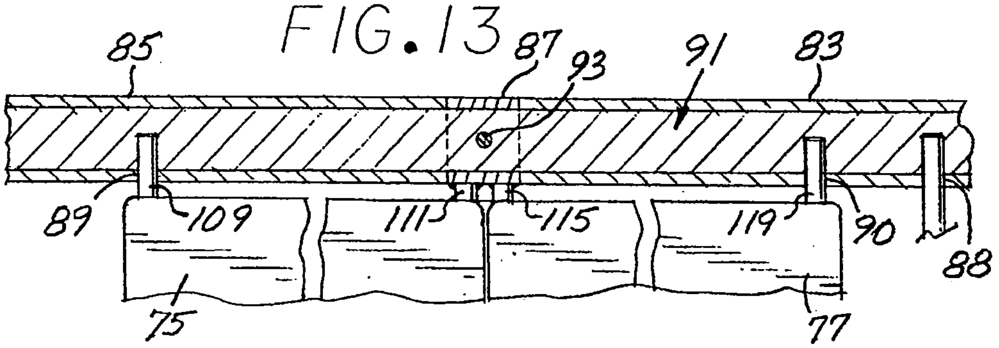
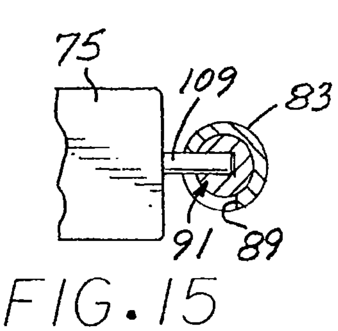
FIG. 15
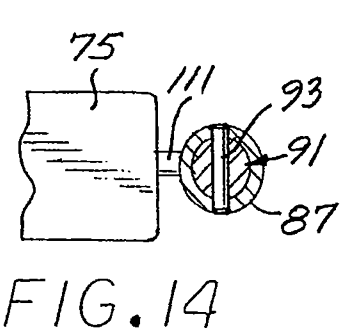
FIG. 14

FIG. 16
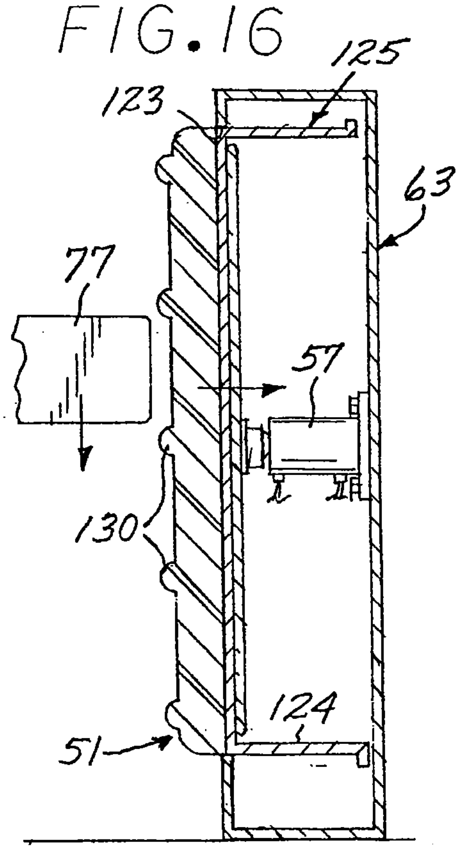
FIG. 17
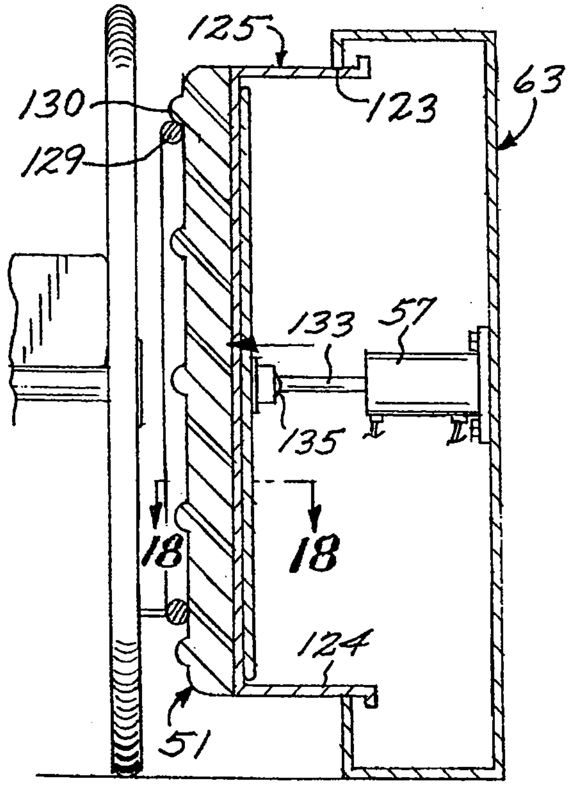
FIG. 19
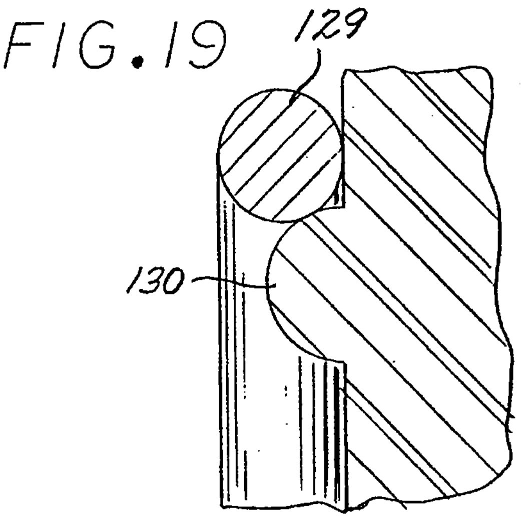
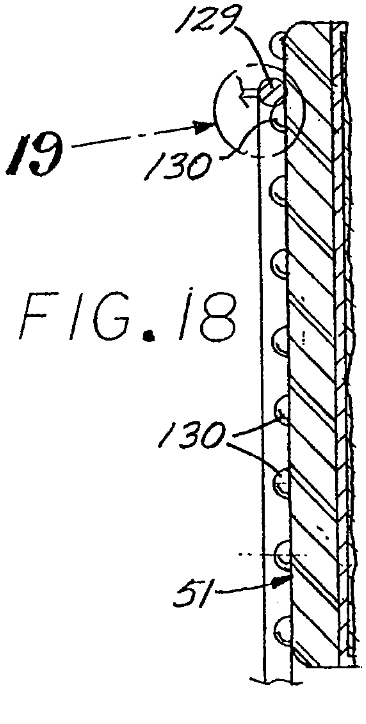
FIG. 18

VEHICULAR WHEELCHAIR DOCKING AND CAPTURE APPARATUS

CROSS-REFERENCES TO RELATED APPLICATIONS

This is a divisional application of U.S. patent application Ser. No. 11/037,603, filed on Jan. 18, 2005, now issued as U.S. Pat. No. 7,425,110, entitled Vehicular Wheelchair Docking And Capture Apparatus, which is incorporated by reference herein in its entirety.

FIELD OF THE INVENTION

The present invention relates to devices for holding wheelchairs in position on a motor vehicle.

BACKGROUND OF THE INVENTION

For many years there has been acute awareness of the need to provide safety on common carriers for physically challenged who are restricted to traveling in a wheelchair or other personal vehicle. Numerous efforts have been made to provide tie down and anchoring devices for securing a wheelchair in position in a bus or other carrier. Awareness of this need has led to the enactment of safety laws which require a vehicle to be equipped with spaces for parking wheelchairs or other personal devices for securement safely to the vehicle. The challenge has been for designers to provide a tie down device which is secure, fail safe and at the same time easy and convenient to operate by the occupant or vehicle driver. Numerous different devices have been proposed in effort to solve these problems as evidence in U.S. Pat. Nos. 4,973,022 and 5,344,265.

Many of these devices suffer the shortcoming that they are impossible for the wheelchair occupant to operate unassisted and, even with help may take several minutes to secure in place. See U.S. Pat. No. 4,973,022.

Examples of wheelchair tie down devices include a three point anchoring system including an anchor for attachment to the rear of the wheelchair and personnel securing belt as well as a front wheelchair attachment assembly as shown in U.S. Pat. No. 6,113,325.

Other efforts have led to proposal that a wheelchair tie down device include a locking mechanism mounted to the vehicle floor and a bar mounted to the underside of the wheelchair. The locking mechanism includes a stationary locking structure with a pivoting lock arm and a slot configured to receive the bar. See U.S. Pat. No. 5,628,595.

An upstanding securing stanchion has been proposed for mounting to the floor of a transport vehicle to engage and couple with a wheelchair as shown in U.S. Pat. No. 5,567,095.

In has been proposed to provide a pair of clamp posts having jaw members positioned to engage the wheelchair under frame. A device of this type is described in U.S. Pat. No. 4,973,022.

Other clamping devices have been proposed for attachment to the floor of the transport vehicle and include a pivotable clamped to an adapter intended to be mounted on the underside of the wheelchair. This type is shown in U.S. Pat. No. 4,805,954.

Other efforts have led to a proposal that an electromechanical system including an automated tie down having a latching device mounted to the floor of the transport vehicle, a tie down bracket bolted on the wheelchair and adjustable chokes to secure the wheelchair in place. A device of this type is shown in U.S. Pat. No. 4,730,964.

Devices have been proposed which include a transverse back stop mounted to the floor of the transport vehicle, vertical plates extending longitudinally from the base of the wheelchair and a transverse bail having a cross rod rotatably extended to engage notches in the four ends of the plates. A device of this type is described in U.S. Pat. No. 4,623,289.

It has also been proposed to provide a pair of stands having wheel guide arms for receiving a portion of the hand wheels of a wheelchair, along with latches for securing the wheels in position. A device of this type is shown in U.S. Pat. No. 4,062,209.

I previously worked on a tie down mechanism including tie down straps for engaging the frame of the wheelchair and a take up mechanism for taking up slack in the straps. I assigned my rights in U.S. Pat. No. 5,888,038 on this device to American Seating Company. While this device was built to fill certain needs, it has been recognized that some challenge is presented to the bus operator to locate and retrieve the attachment mechanisms and secure the wheelchair in place. In effort to overcome this shortcoming, a device was proposed which includes a seat belt housing and restraining device mountable to the transit vehicle for retraction of a restraining element and a cable for controlling retraction of such restraining element to operated by a control remote from the housing such for the convenient of the vehicle operator. A device of this type is shown in U.S. Pat. No. 6,524,039.

Other efforts have led to the proposal that wheelchairs incorporate a universal adapter for coupling with a docking assembly latch mounted in a transit vehicle. A device of this type is shown in U.S. Pat. No. 6,474,916. These devices require modification of conventional wheelchairs.

The foregoing devices fail to address the preference by wheelchair occupants that they have some degree of independence in themselves securing the wheelchair in its constrained condition on the transit vehicle.

SUMMARY OF THE INVENTION

The wheelchair docking device of the present of the present invention includes a pair of presses located on opposite sides of a wheelchair docking area in a transit vehicle and, at least one of the presses being operable to press a wheelchair located in such docking area against the other press so as to hold the wheelchair entrapped safely in the docking area.

In one embodiment a control is provided which may be actuated by the occupant of the wheelchair.

Other features and advantages of the invention will become apparent from the following detailed description, taken in conjunction with the accompanying drawings which illustrate, by way of example, the features of the invention.

BRIEF DESCRIPTION OF THE DRAWINGS

FIG. 5 is a perspective view similar to FIG. 3 but with a wheelchair backed into position in the docking area;

FIG. 6 is a front view of the apparatus shown in FIG. 5;

FIG. 7 is a front view similar to FIG. 6 but with the apparatus actuated to hold the wheelchair in position;

FIG. 8 is a back view of the apparatus shown in FIG. 7;

FIG. 12 is a vertical sectional view taken along the line 12-12 of FIG. 11 (broken);

FIG. 13 is a longitudinal sectional view taken along the line 13-13 of FIG. 12;

FIG. 14 is a transverse sectional view taken along the line 14-14 of FIG. 12;

FIG. 15 is a vertical sectional view taken along the line 15-15 of FIG. 12;

FIG. 16 is a vertical sectional view comparable to FIG. 9 but with the passengers seat released;

FIG. 17 is a vertical sectional view similar to FIG. 16 but with the wheelchair constrained;

FIG. 18 is a transverse sectional view taken along the line 18-18 of FIG. 17;

FIG. 19 is an enlarged detailed view taken from the circle 19 in FIG. 18;

DETAILED DESCRIPTION OF THE PREFERRED EMBODIMENTS

Figure 1:
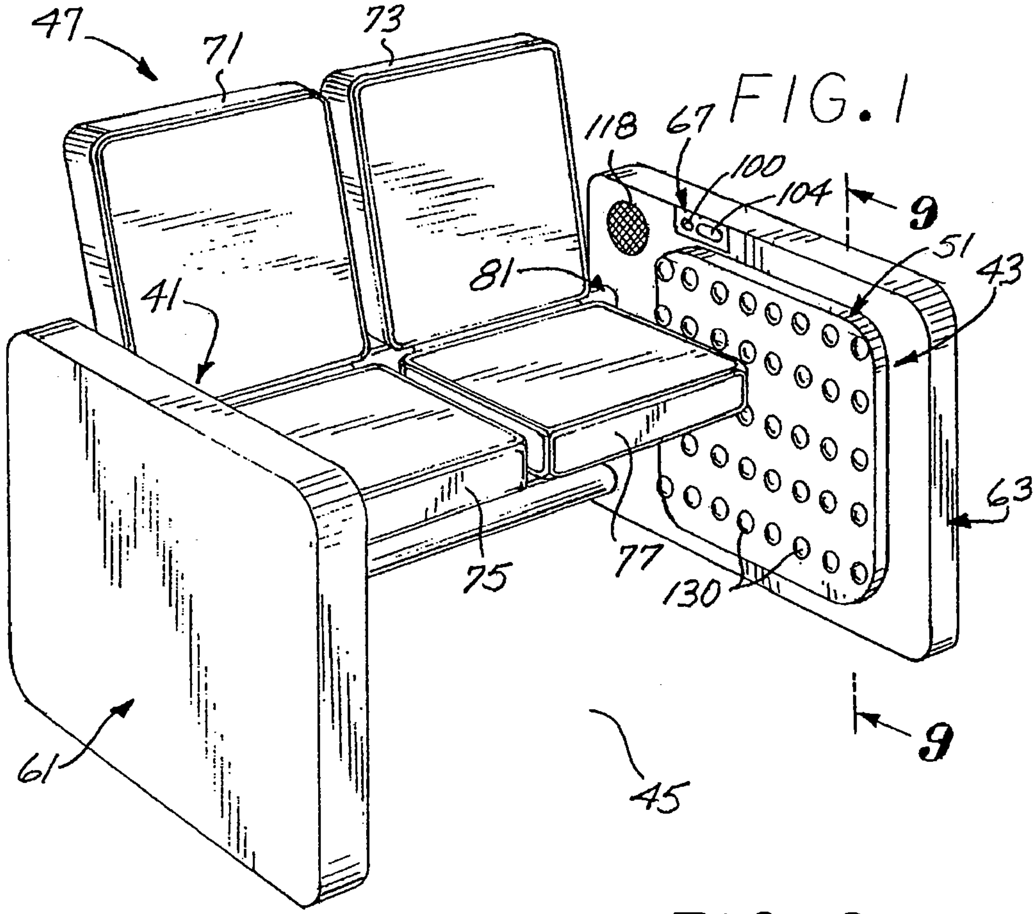
FIG. 1 is a perspective view of a wheelchair docking and capture apparatus embodying the present invention.
Figure 2:
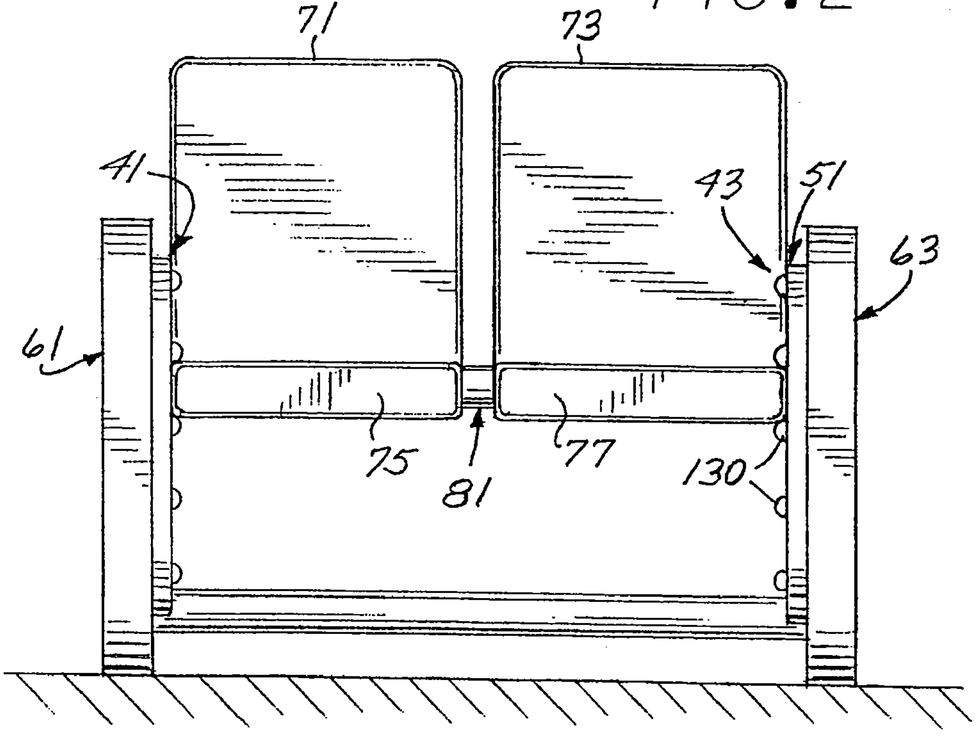
FIG. 2 is a front view of the apparatus shown in FIG. 1.

Referring to FIGS. 1-10, the wheelchair docking apparatus of the present invention may be in the form of a pair of press devices 41 and 43 mounted on the opposite sides of a wheelchair docking area 45 where retractable passenger seat apparatus 47 is installed. The press devices 41 and 43 may include respective compressible holding cushions, generally designated 51, carried on respective press plates 53 (FIG. 9) driven laterally by respective air cylinders 57 (FIG. 9) so as to be shifted between the retracted position shown in FIG. 16 and the extended position shown in FIG. 17 engaging the hand wheel 59 of a wheelchair, generally designated as 131, restraining it in position.

Figure 28:
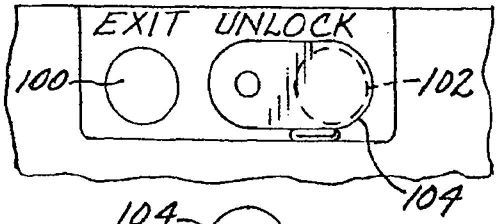
FIGS. 28 and 29 are top plan views, in a large scale, of the occupant control which may be incorporated in the apparatus shown in FIG. 1.
Figure 29:
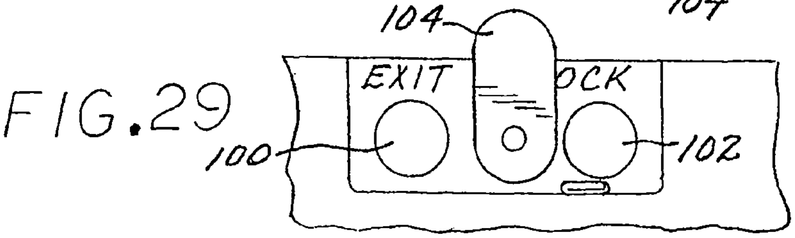

The presses device 41 and 43 may be mounted from respective armrest frames, generally designated as 61 and 63. In a preferred embodiment, the arm rest frames 63 mount a passenger control plate, generally designated 67, operable by the passenger to actuate the press devices. Referring to FIGS. 1, 28 and 29, the control plate 67 includes an exit actuator button light 100 and unlocking button 102 normally covered by a pivotal cover 104 allowing the occupant to notify the driver when a destination is near and to unlock and release the presses.

The physically challenged have a great desire for some degree of independence and capability of taking care of their own needs. Often times, unwanted contact with a patient's wheelchair or other personal vehicle is considered as offensive as unwanted contact with the person themselves. Moreover, common modesty is frequently offended by the fact that any vehicle operator must, in anchoring down a wheelchair requiring attachment from the front side, position the operators head in a location where unwanted viewing may be had of private areas thus adding to the distress that may be experienced by one who may already be at risk of perceiving themselves as being vulnerable. Thus, an unaddressed need is for a wheelchair docking system which can be operated without the necessity of dangling straps and tethers which, in practice must be retrieved and attached to various frame work on the wheelchair and for a system where there is no requirement for the operator to himself or herself directly contact the wheelchair or person in making the wheelchair secure. Furthermore, it would be desirable if the wheelchair occupant could, at least to some extent, be involved in the securement and release of the wheelchair from a docking station. Various embodiments of the present invention present one or more of these advantages. As used herein, the term wheelchair is intended to apply to any personal vehicle such as a scooter or the like to be ridden onto a transit vehicle and secured thereto.

Figure 3:
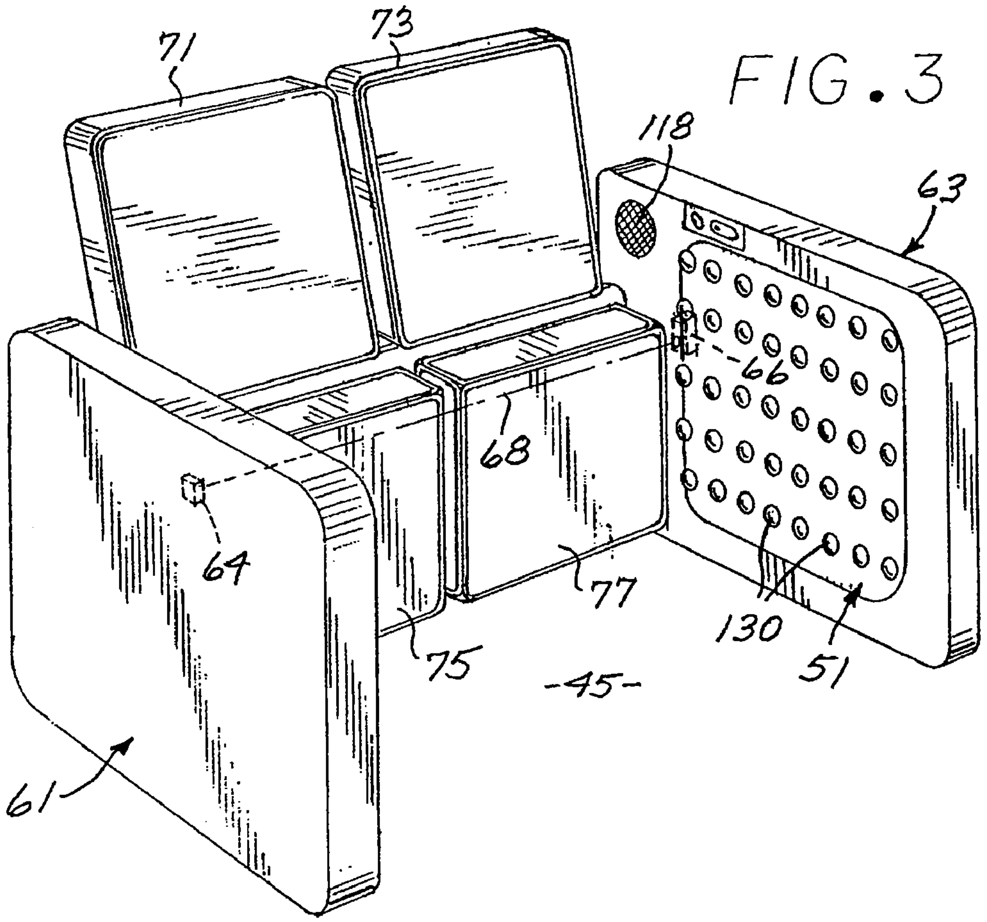
FIG. 3 is a perspective view of the apparatus shown in FIG. 1 but with the seat portions of the passengers seat devices lowered.
Figure 4:
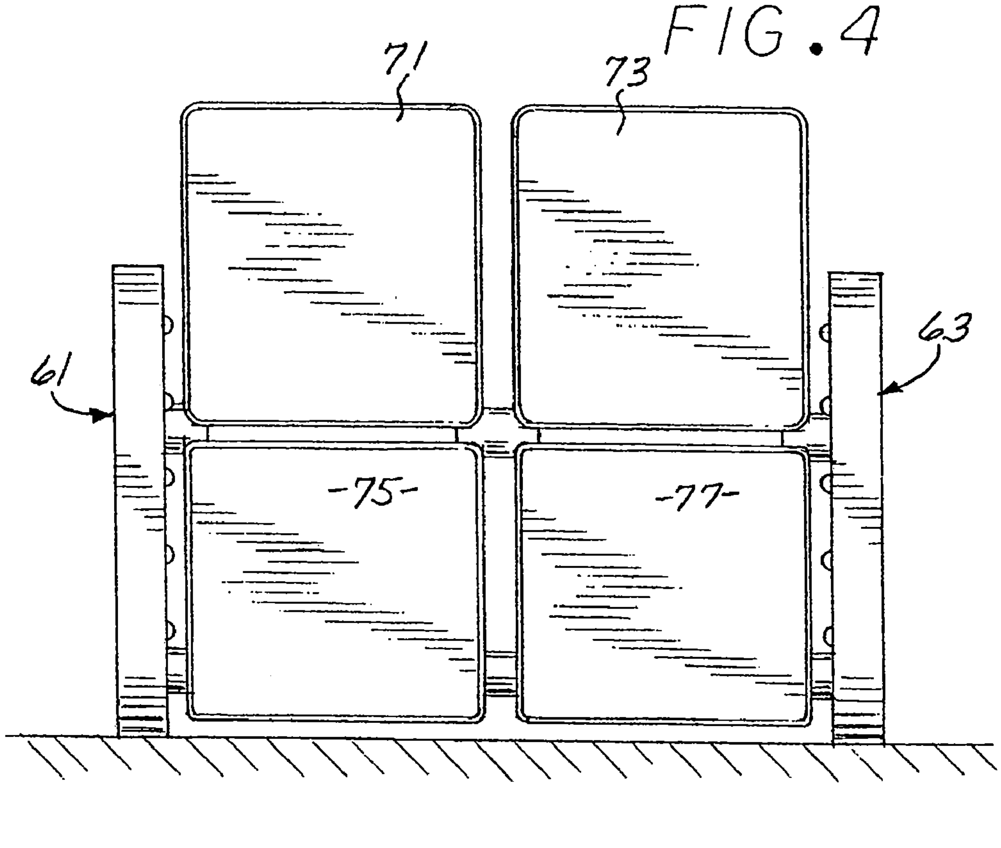
FIG. 4 is a front view of the apparatus shown in FIG. 3.
Figure 9:
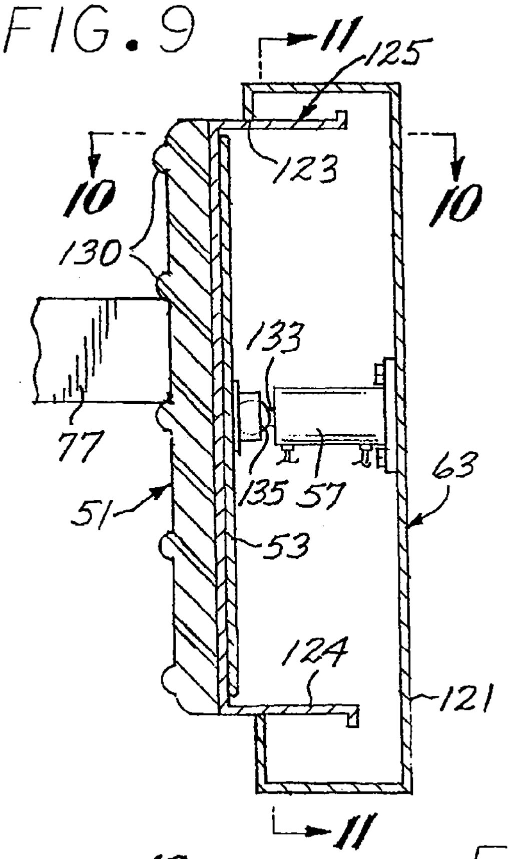
FIG. 9 is a vertical sectional view, in enlarged scale, taken along the line 9-9 of FIG. 1.
Figure 10:
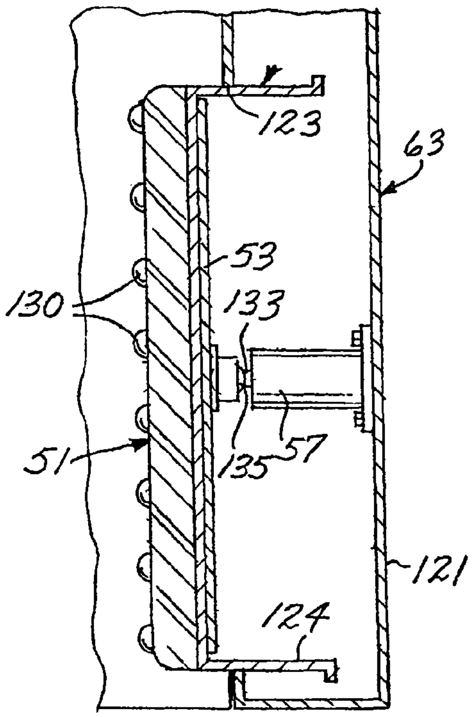
FIG. 10 is a horizontal sectional view taken along the line 10-10 of FIG. 9.

Referring to FIGS. 1, 3 and 9, in the exemplary embodiment of my invention, a pair of bench ends may be configured to define the armrest frames 61 and 63 spaced apart on opposite sides of the seat assembly 47 and mounting in confronting relationship the pressed devices 43. The seat assembly 47 includes a pair of chairs including forwardly facing seat backs 71 and 73 and a pair of seats 75 and 77 carried from a retraction tube and rod assembly, generally designated 81 (FIGS. 1 and 12). Referring to FIGS. 12 and 13, the rod tube and assembly 81 include spaced outer tubes 83 and 85 mounted at their distal ends by mounting plates to the outside walls of the respective arm rest frames 61 and 63 having sandwiched between their approximate ends a short collar 87 having the respective one ends of seat cushion frame members 111 and 115 welded thereto (FIG. 13). As shown in FIG. 12 mounted to the top side of the tubes 83 and 85 are respective back cushion frame members 101, 103, 105 and 107 which mount the respective back cushion 71 and 73.

Received freely rotatable within the tubes 83 and 85 is a control rod, generally designated 91 which is keyed centrally to the collar 87 by means of a cross pin 93. The wall of the tube 85 is formed in its right hand end (FIG. 12) with a forwardly and downwardly opening circumferential 900 slot 88 and the tubes 83 and 85 are formed with respective longitudinally spaced apart, forwardly and downwardly facing 90° slots 89 and 90 for purposes which will be described herein and after.

The seats 75 and 77 are carried on the seat frame rods 111 and 115 and on rods 109 and 119. The rods 109 and 119 project from the side of the rod 91 through the respective slots 89 and 90 and the intermediate frame rods 111 and 115 are attached to the collar 87 as described above (FIGS. 12-15).

Figure 11:
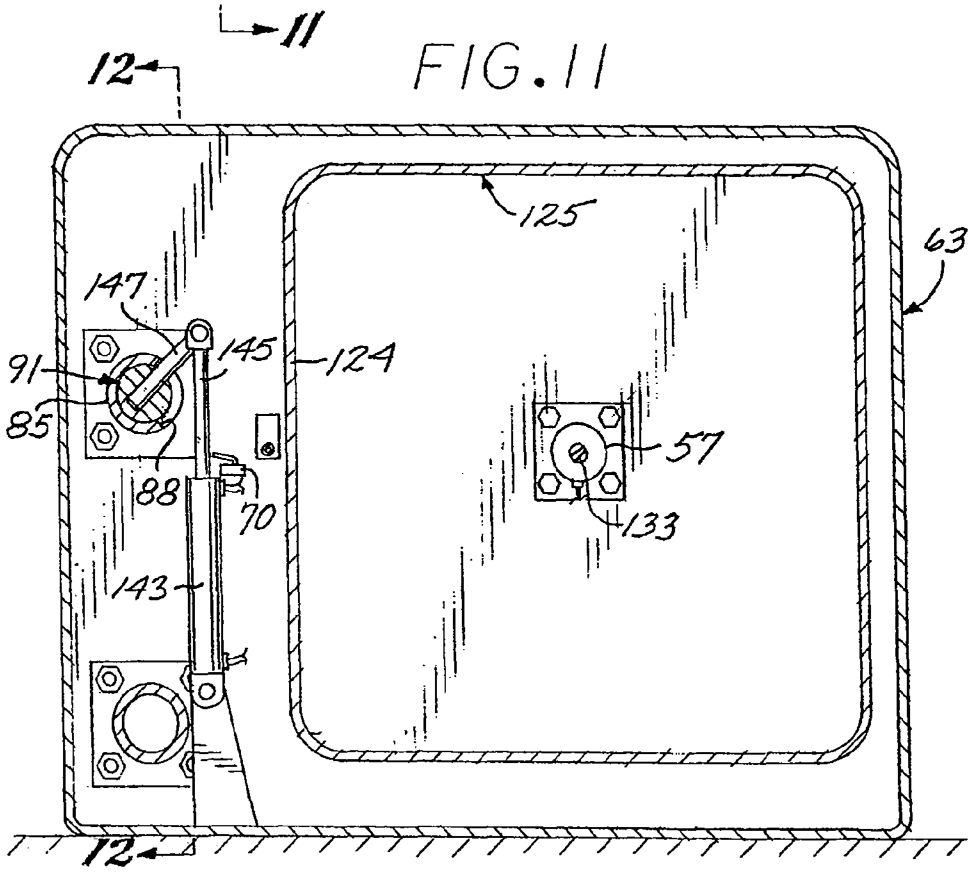
FIG. 11 is a vertical sectional view taken along the line 11-11 of FIG. 9.

Referring to FIGS. 9 and 11, the arm rest frames 61 and 63 are in the form of respective hollow housings 121 formed on the inner walls with square windows 123 about 20" wide and into which are telescoped respective pistons, generally designated 125, which mount the compressible holding cushions 51 on the exterior surface thereof for compressingly engaging the hand wheel of a wheelchair 129 of a wheelchair, generally designated 131, as shown in FIG. 17.

The piston 125 is driven by the piston rod 133 of the air cylinder 57 (FIG. 9) coupled by swivel foot 135 which pushes on the press plate 53 to press such cushion against the opposite sides of the wheelchair to hold it in place. As will be appreciated by those skilled in the art, the compressive restraint of the wheelchair may be made by a pair of laterally reciprocating presses as disclosed or for instance by, a stationary press on one side, a laterally shiftable conveyor floor element to allow lateral driving of the occupied wheelchair by a laterally traveling press on the other side, or any combination thereof, it only being important that a press device be provided for firmly entrapping the wheelchair to prevent escape thereof.

In the preferred embodiment press devices 125 are depicted as having a generally square cross section with a dimension of about 30 inches on each side thus affording a relatively large parametrical tubular piston wall 124 which is received in close spaced relationship within the respective windows 123 in the respective arm rest frames 121 to afford high integrity support for the press itself. As will occur to those skilled in the art, this configuration made in different forms, including traditional piston and rod construction or high pressure fluid bladder materials or mechanical drives, it only being important that the construction afford a high degree of restraint to support against travel in the lateral and forward and rearward directions and that on at least one side of the wheelchair, there be forced lateral movement of the press to positively trap the wheelchair itself between the opposite press devices.

The drive mechanism to drive the press devices may take many different forms, including jackscrew, scissors jack, electric motor, spring bias or other mechanisms well known to those skilled in the art. In one embodiment the holder cushions are in the form of thick walled bladders driven to the press constraining positions by pressurized fluid admitted by a fluid valve. The holding cushion 51 in the preferred embodiment is typically formed of a tough closed pore sponge construction formed on its exterior with a tough skin and is formed on its working wall with undulations in the form of raised knobs 130 spaced thereabout in a square pattern for resisting translation across the surface thereof by the wheelchair hand wheel 129 or other wheelchair component engaged therewith. The holding device may take numerous different forms including pads or sockets with preformed depressions, compressible padding, padding formed by projecting bristles, coarse felt, pneumatic or hydraulic bladders or any other equivalent preformed or compressible devices as will occur to those skilled in the art.

Refer to FIG. 3, in some embodiments, a transmitter 64 is mounted on the inside wall of the arm rest frame 61 to transmit an RF beam across the path of the seats 73 and 75 to a receiver 66 mounted on the inside wall of the frame 63. Such transmitter is connected in the circuit with a seat limit switch 70 (FIG. 30) positioned in the path of the seat 77 to activate the transmitter when the seat has reached its fully lowered position.

Referring to FIGS. 11 and 12, mounted rearwardly in the arm rest frame 63 is seat retraction air cylinder 143 having its piston rod 145 connected pivotally with a bell crank 147 projecting from the control rod 91 and through the slot 88 to thus allow the piston to rotate such rod things through an arc of 90°. The chair seat retractor may, of course, take numerous different forms including gear drive, hydraulic drive, electric or hydraulic motors or other mechanisms known to those skilled in the art.

Referring to the modification of the present invention shown in FIGS. 20-23, it will be appreciated that a U-shaped rigid grab bar, generally designated 201, may be secured at the opposite ends of its legs by pivotal connection to the opposite sides of the respective seat backs 71 and 73. The bar 201 includes a metal tube 203 defining a frame and which is covered with resilient cushioning tubes 205 and 207. Mounted medially on the bar is an air cushion housing, generally designated 211, having a rearwardly facing cover plate 213 (FIG. 21) which is openable in response to the cushion being inflated.

Figure 20:
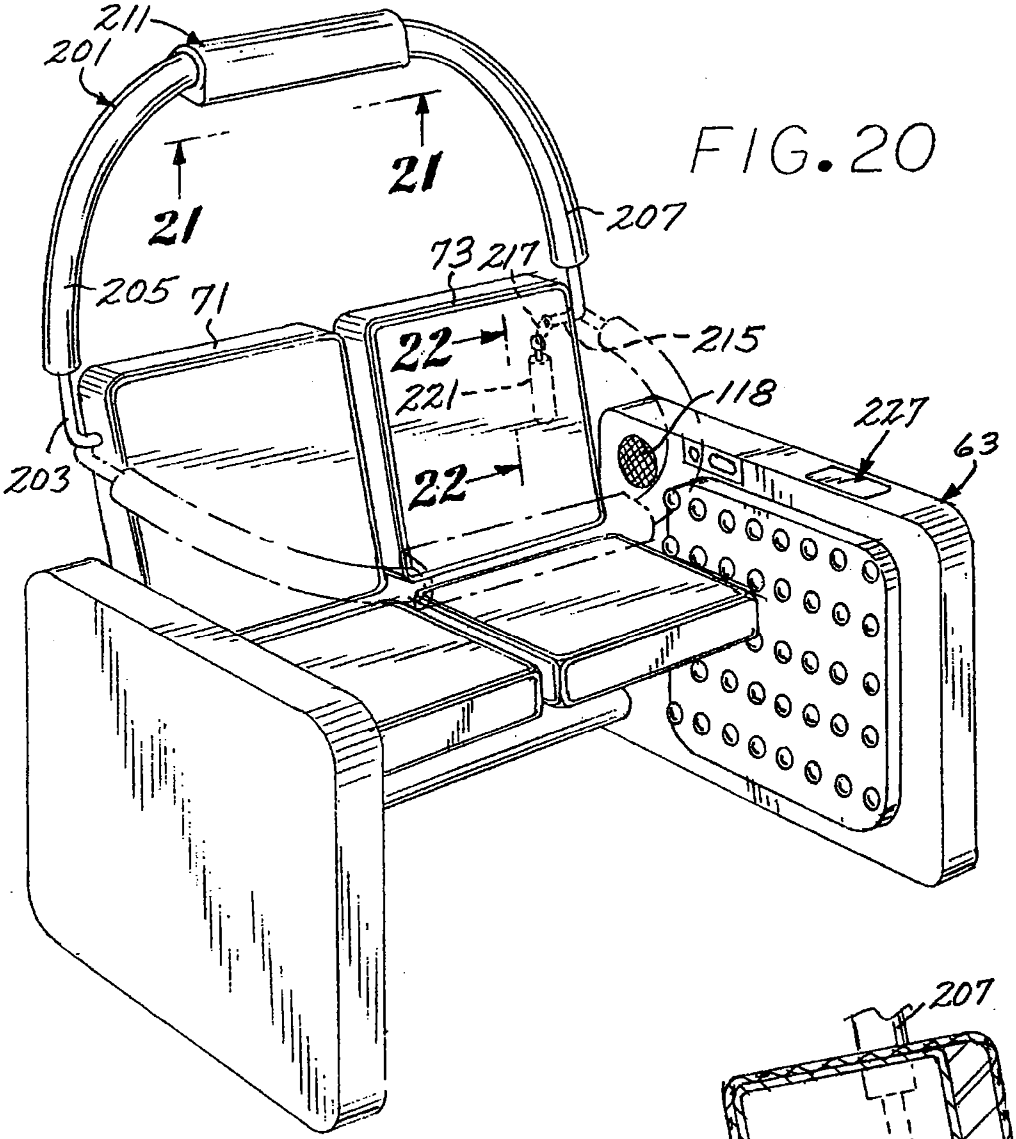
FIG. 20 is a respective view similar to FIG. 1 which is showing a second embodiment of the wheelchair constraint apparatus of the present invention.
Figure 21:
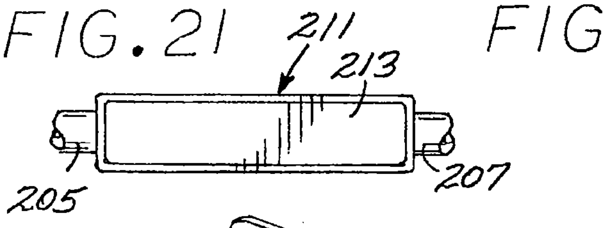
FIG. 21 is a partial bottom view taken along the line 21-21 of FIG. 20.
Figure 22:
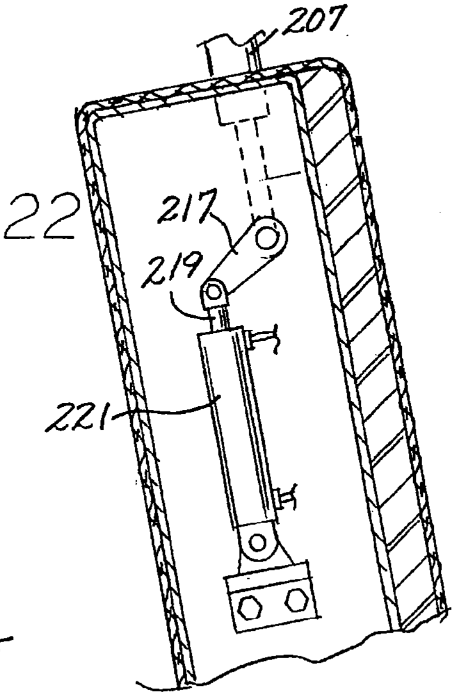
FIG. 22 is a vertical sectional view, in a large scale, taken along the lines 22-22 of FIG. 20.

Referring to FIGS. 20 and 22, the left hand end of the grab arm tube 203 is formed with an in turned axial stem 215 on which is mounted a bell crank 217 connected on its free extremity with the piston rod 219 of an air cylinder 221 which is operative to raise and lower the bar 201.

Figure 23:
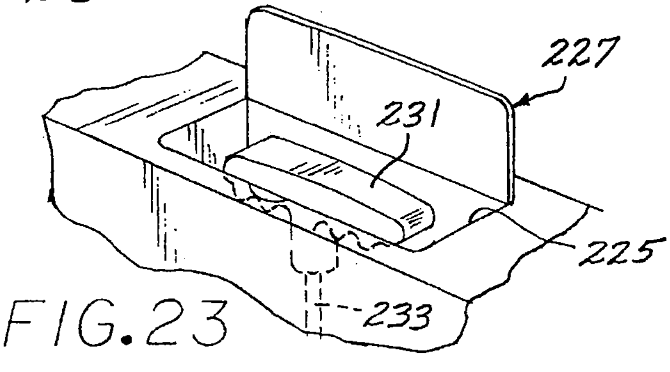
FIG. 23 is a partial perspective view, in a large scale, of the left hand arm press shown in FIG. 20.

With continued reference to FIG. 20 and further referring to FIG. 23, the arm rest frame 63 is formed in its upper forward surface with an opening 225 which is normally closed by a hinged cover 227. Mounted in retracted position below such cover 227 is an emergency release pull handle 231 having a cable 233 leading therefrom to the control system as will be described herein after.

The left hand arm rest frame 63 has mounted rearwardly therein a speaker 118 (FIG. 1) for communicating with the passengers in the seat assembly 47 or a wheelchair passenger located in the wheelchair dock.

Figure 26:
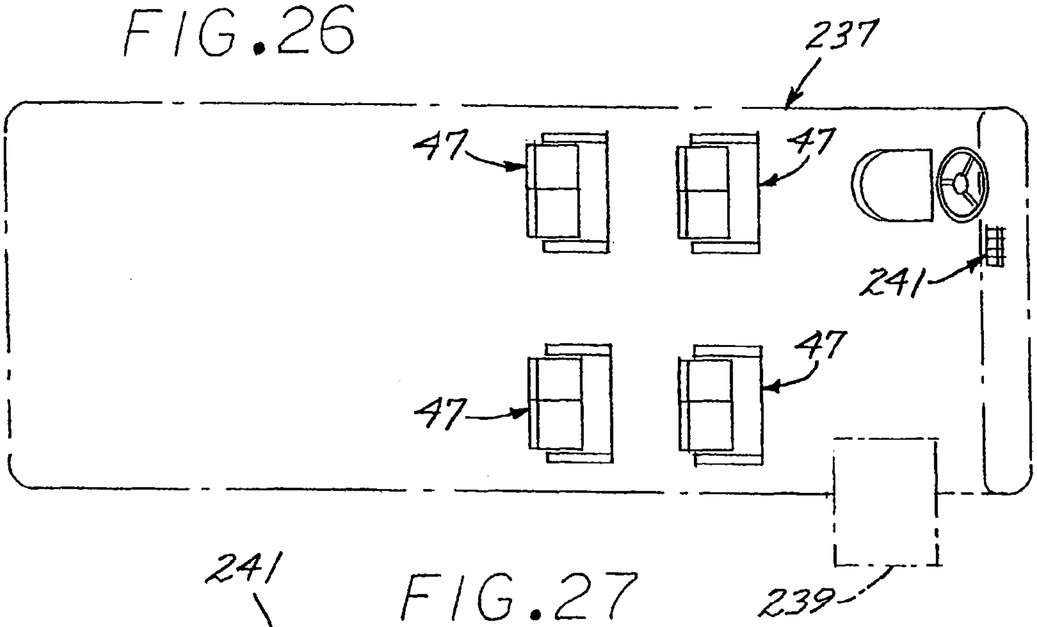
FIG. 26 is a representative lay out in a transit vehicle, in reduced scale, with the apparatus shown in FIG. 1.

It will be appreciated that the wheelchair docking apparatus of the present invention may be installed in numerous different transport vehicles, such as buses, vans, trains and boats. Referring to FIG. 26, an exemplary installation is shown for a transit bus, generally designated 237 which may be a low floor bus having hydraulic lowering capability and an extendable ramp 239 for entry of the wheelchairs. In this configuration, a plurality of docking assemblies 47 may be installed abreast of one another. A control panel, generally designated 241 may be mounted on the bus dash. The control panel is configured to control a programmable electro-pneumatic operating system as depicted diagrammatically in FIG. 30.

Figure 30:
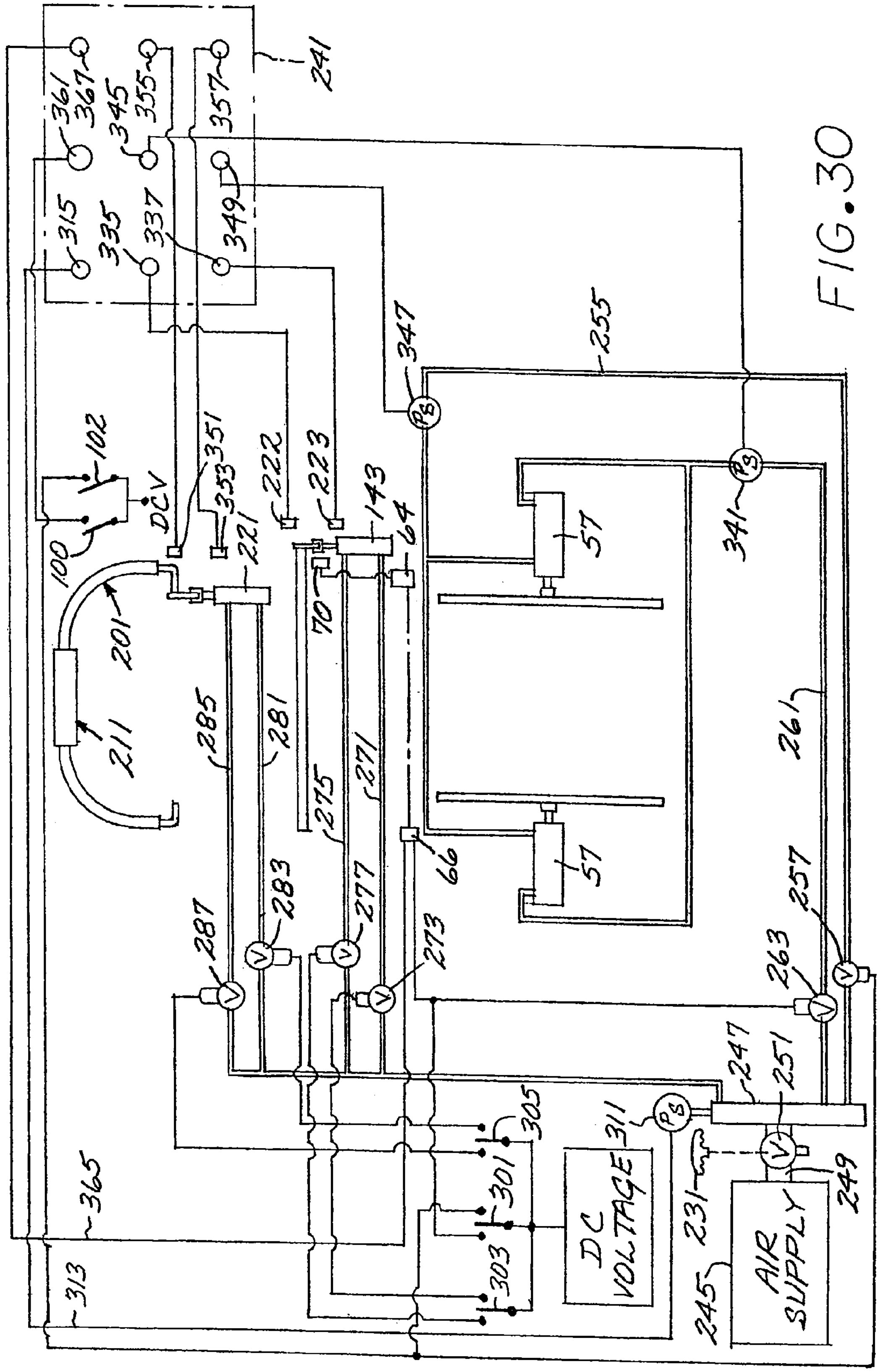
FIG. 30 is a diagrammatic view of a control system which may be utilized with the wheelchair apparatus shown in FIG. 20.

The control and drive system may be operated by air, oil, electric motors or any combination thereof. Transit buses typically incorporate air brakes and have a ready air supply 245 (FIG. 30). The air supply compressor is connected with a manifold 247 via a conduit 249 including a emergency exhaust valve 251 controlled by the emergency handle 231. The rod ends of the respective press actuator cylinders 57 are connected with the manifold 247 via a pressure conduit 255 including a retraction electric valve 257. The blind ends of the respective cylinders are connected with the manifold via an actuation conduit 261 including an actuation electric valve 263.

With continued reference to FIG. 30, the blind end of the seat actuator air cylinder 143 is connected with the manifold 247 via an air conduit 271 including a lifter actuation valve 273 and the rod end of such cylinder is connected with the manifold via an air conduit 275 including a seat lowering electric actuator valve 277.

The blind end of the retaining area a cylinder 221 is connected with the manifold 247 via a conduit 281 including an air lowering valve 283 and the rod end of such cylinder is connected with the manifold via a conduit 285 including an air lifting electric valve 287.

The respective pairs of valves 263 and 257, 273 and 277, 283 and 287 are all connected with the respective opposite contacts of double pole toggle switches 301, 303 and 305 in (FIG. 27) which may be on the control panel 241 for manual override by the bus driver.

Figure 27:
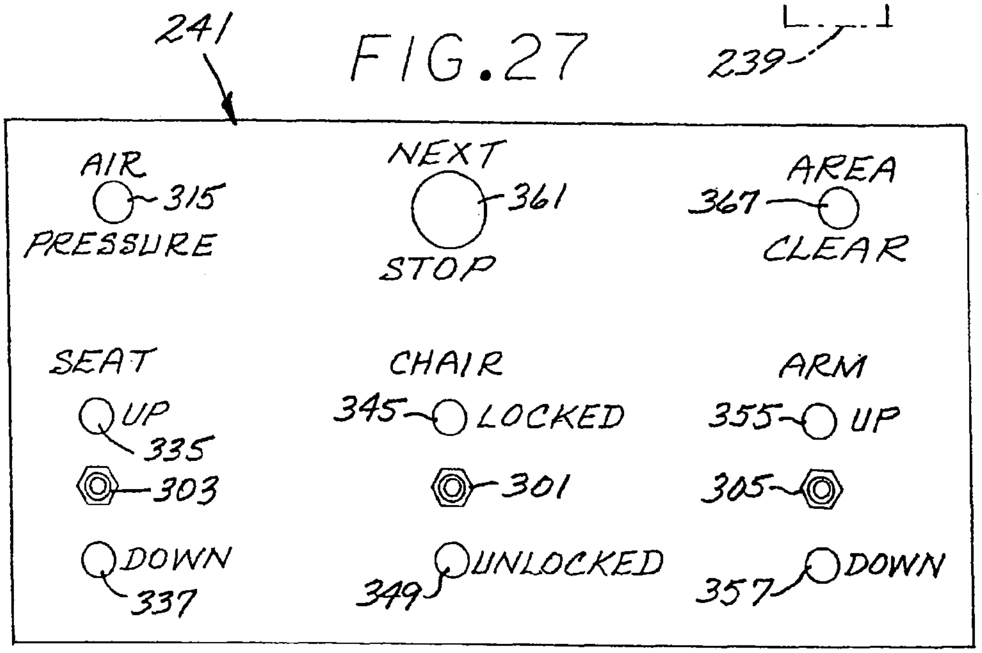
FIG. 27 shows a control panel which may be utilized with the apparatus shown in FIG. 1.

Referring to FIG. 30, mounted on the pressure manifold 247 is a pressure switch 311 connected by an electric lead 313 to an air pressure indicator switch 315 on the control panel 241. Disposed in the path of the seat 77 are a pair of chair up and chair down limit switches 222 and 223 (FIG. 30) connected to respective chair up and chair down indicator lights 335 and 337 (FIG. 27).

Included in the pressure device actuating line 261 is a pressure switch 341 connected to a chair locked indicator light 345 and included in the pressure device retraction conduit 255 is a pressure switch 347 connected with an air unlocked indicator light 349. Mounted in the path of the safety arm 201 are respective arm up and arm down limit switches 351 and 353 connected with respective indicator lights 355 and 357.

A next stop indicator light 361 is mounted centrally on the panel 241 and is connected in the circuit with the exit button 100 on the control plate 67 (FIGS. 1 and 28).

Connected with the wheelchair detector receiver 66 by a lead line 365 is a clear indicator light 367 to indicate when the beam from the emitter 66 is unbroken.

Figure 24:
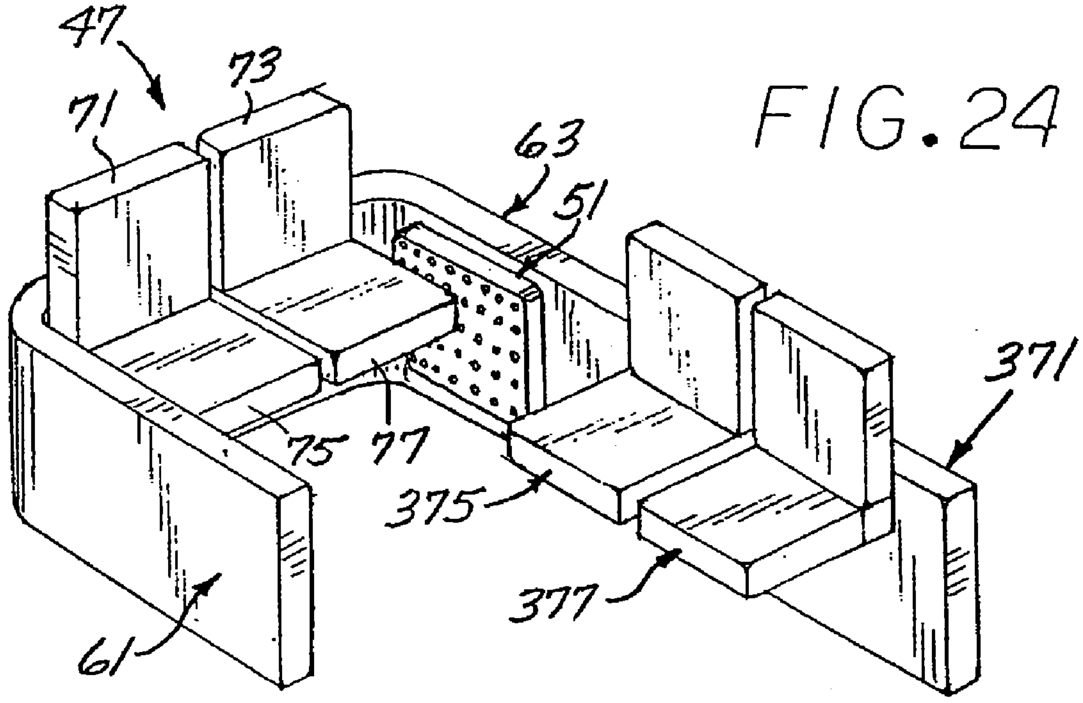
FIG. 24 is a perspective view of a representative lay out in a transit vehicle for the apparatus shown in FIG. 1 but depicted in reduced scale.
Figure 25:
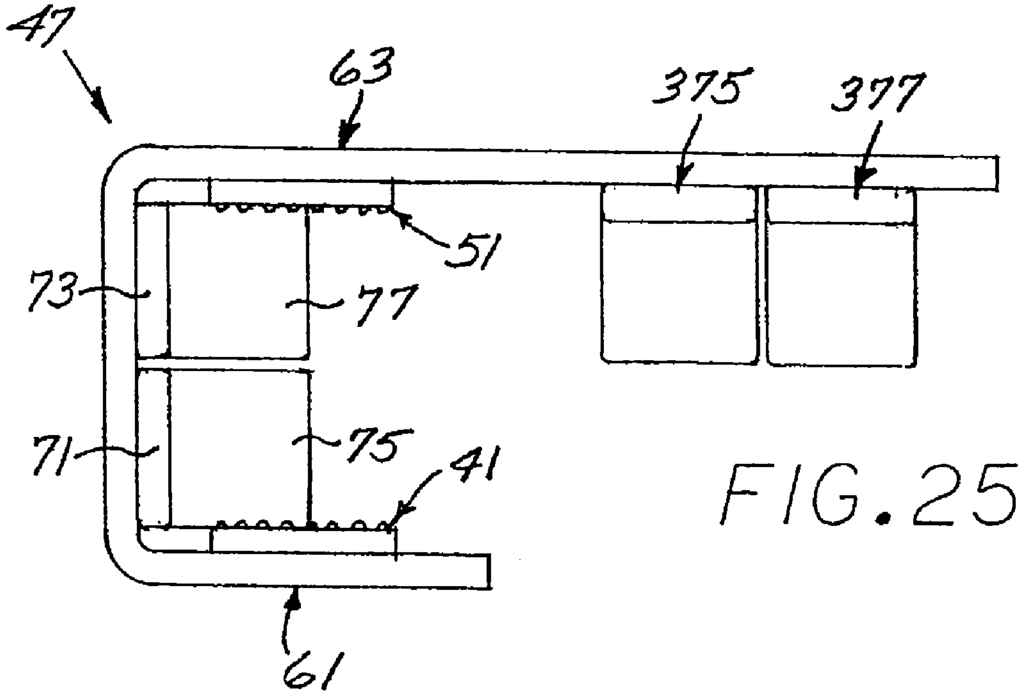
FIG. 25 is a top plan view of the apparatus shown in FIG. 24.

As it will be appreciated by those skilled in the art, the arrangement of the wheelchair docking assembly of the present invention may take many different forms and, if desired, may be mounted in a compartment defined by a compartment wall 371 as shown in FIGS. 24 and 25. In this arrangement, the assembly 371 is mounted with the arm rest frames 61 and 63 arranged against the opposite sides of the compartment wall 371. In this arrangement, a pair of foldable attendant seats, generally designated 375 and 377 may be mounted facing laterally in front of the assembly 47 for ready access by an attendant.

In operation, it will be appreciated that the docking assembly of the present invention may be manufactured and shipped to the installer as a unit. Once one or more units have been installed in a vehicle, such as a transport bus 237 of FIG. 26 for the exemplary embodiment, very little if any intervention will be required by the driver, typically limited to tasks that may be performed from the driver's seat, leaving the wheelchair occupant with some sense of independence and control of his or her movement. When the bus draws to a stop the driver may actuate an air cylinder (not shown) to deploy the ramp 233 and lock the rear brakes of the vehicle while the door is open and the wheelchair occupant can roll up the ramp to access the bus. Meanwhile, the bus driver will have actuated the automatic control for the particular seat assembly to be readied for the wheelchair causing the automated announcement to be played through the speaker 118 (FIG. 1) alerting any occupants that they should vacate the seat assembly 47 in advance of the wheelchair entry. Giving the occupants some time to vacate those seats tends to minimize any offense which might otherwise be felt by the bus passengers and can serve to expedite docking of the wheelchair to thereby minimize disruption and endeavor to maintain a higher degree of harmony between the bus passengers and the occupants entering wheelchair or wheelchairs. The bus driver can monitor the air pressure indicator light 315 on the panel 241 to be assured that the mechanisms to lower the seats 75 and 77 and to operate the presses 43 have sufficient air pressure. After a ten second delay from actuation the control will open the retraction electric valve 257 (FIG. 30) to pressurize the rod end of the respective cylinders 57 (FIG. 9) to drive the respective rods to their retracted positions as shown in FIG. 16 to thereby shift the respective holding cushions 43 outwardly to clear the opposite lateral edges of the respective seats 75 and 77 to thereby unlock such seats to free them for lowering. The normally closed electric valve 277 (FIG. 30) will then be opened to drive the piston rod 145 downwardly as viewed in FIG. 11 to rotate the control rod 91 clockwise to thereby lower the seats 75 and 77 from their positions shown in FIG. 1 to the position shown in FIGS. 3 and 4. As the seats rotate downward to their retracted positions, the limit switch 70 (FIG. 30) will be actuated to actuate the emitter 64 ready to detect the presence of a wheelchair in the docking area 45.

It will be appreciated that should the driver observe any circumstances dictating he or she should override the automatic control system, he or she may switch the toggle switch 301 downwardly (FIG. 27 to override and retract of the press devices and or switch the toggle switch 303 upwardly to lower the seats.

The wheelchair occupant may then maneuver his or her wheelchair to back into the docking space 45 (FIG. 3). As the occupant backs into the docking space, the wheelchair will break the beam 68 from the transmitter 64 for thus actuating the receiver 66 (FIGS. 3 and 30) to open the actuation valve 263 to pressurize the blind end of the respective drive cylinders 57 driving the holding cushions 51 outwardly toward one another to engage the opposite sides of the wheelchair. In the case of a wheelchair having a hand wheel 129 (FIG. 17), the press cushions will engage the laterally outwardly facing surface of such hand wheels and continued pressing inwardly of such cushions toward the wheelchair will in trap and contain the wheelchair between the respective holding cushions 51. In the preferred embodiment such cushions are compressible and the pressure applied to the press cushions will be sufficient to cause the hand wheels to locally compress such cushions to thereby cooperate in containing the hand wheels between the press cushions on the opposite sides of the wheelchair. In the exemplary embodiment, the raised knobs forming the buttons 130 (FIGS. 18 and 19) will serve to, in selected areas, engage the front and rear surfaces of the hand wheel 129 to thus cooperate in entrapment. As will be appreciated that with these compression forces on the holding cushion, any forward or rearward force applied to the wheelchair relative to the press devices will serve to apply a force to such cushions which will have a major shear vector which will be resisted by the strength of the cushion material as it resists forward or rearward movement of the wheelchair. The depression in the cushion material formed by the configuration of the hand wheels 129 and the barrier to transitional movement by the knobs 130 which engage the surface of the hand wheel facing the side opposite the direction to which inertia forces may be applied to the wheelchair and wheelchair frame will serve to cooperate in resisting relative movement. The forces applied to the cushion by such inertia of the wheelchair and its occupant will typically be opposed by a considerable sheer vector tending to maintain the wheelchair securely captive and preventing unwanted forward or rearward movement thereof relative to the press devices. The wheelchair hand wheels 129 typically run between 9 inches and 24 inches in diameter and hereby providing a substantial contact area with the cushion which serves to provide a high degree of material strength resisting inertia movement of the wheelchair. The holding elements will thus typically have a dimension of between 10 and 30 inches with robust cross section for the piston. It will be appreciated that the forces applied by any momentum of wheelchair and occupant should the bus abruptly decelerate will be resisted to a great degree by the shear forces generating shear stresses at the interface between the edges of the windows of the respective arm rest frames and the peripheral walls of pistons 125 thus affording a high degree of structural strength. In the preferred embodiment the compression of the wheelchair between the press devices will be sufficient to resist an inertia force of at least 2000 pounds tending to dislodge the occupied wheelchair.

It will be appreciated that once the wheelchair is backed into position within the docking area 45, for those embodiments including the grab arm 201, such arm may be lowered. This may be achieved by automatically responding to positioning of the wheelchair to break the beam from the transmitter 64, or other position detector or may achieved by the bus driver actuating a toggle switch 305 (FIG. 27) downwardly to open the valve 283 (FIG. 30) to the blind end of the actuator cylinder 221 to extend the rod 219 (FIG. 22) to rotate such arm 201 to the broken line position shown in FIG. 20. When arm reaches its fully lowered position it will contact limit switch 353 thus energizing an arm down indicator light 357 to alert the bus driver the wheelchair is secured in position and the arm is down. The occupant may draw a retracted chest belt from a reel mounted high on his or her left side across his or her chest to lock to a conventional buckle (not shown). In the event a rapid deceleration of the bus the wheelchair occupant can grip the grab arm or if thrown forward will be restrained in the upper torso by such bar. Furthermore, should the transport vehicle be involved in a head on collision resulting in rapid deceleration, the decelerator in the air cushion compartment 211 on the arm 201 will be actuated thereby pressurizing the cushion contained therein popping the cover 213 loose (FIG. 21) to cushion the forward movement of the upper torso of the wheelchair occupant. In the illustrated embodiment the grab arm will resist at least about 2000 pounds of force.

It will be appreciated that the above procedure for docking a wheelchair is relatively rapid, on the order of 45 seconds or less, thus minimizing interference with the schedule of other passengers and providing a secure docking with no or minimal intervention by the driver. During such docking process, the ramp 233 may retract and the bus will be in position for release of the brakes to continue the route.

When the bus approaches the destination for the wheelchair occupant, he or she may press the exit button 100 to energize the exit light 361 or press the unlock button 102 (FIG. 30) to open the valve 257 and pressurize the rod ends of the press cylinders 57 to retract the holding cushions 51 to the retracted position shown in FIG. 16 thereby disengaging the respective hand wheels 129 and freeing the wheelchair for exit. Alternatively, the driver may press the toggle 301 downwardly as viewed in FIG. 27 to initiate the unlocking process to free the wheelchair. Concurrently, the arm 201 will be raised, either by an electrical coupling of the switches or by the operator flipping the toggle switch 305 down as shown in FIG. 27 to open the valve 387 and pressurize the rod end of the cylinder 221 (FIG. 30). Once the arm reaches its full up position it will engage limit switch 351 thereby energizing the indicator light 355 (FIG. 27) to indicate the arm is full up.

As the wheelchair moves free of the docking area 45, the beam from the transmitter 64 will be sensed by the receiver 66 indicating the area is clear and the seats 75 and 77 can be raised. Again, the raising signal may be automatic or manual, as by switching the toggle switch 303 (FIG. 27) up to open the valve 273 to pressurize the blind end of the cylinder 143 (FIG. 11) thereby rotating the control rods 82 and 84 counterclockwise as viewed in FIG. 11 to raise the seats to the seating position. Once the seat reaches its raised position, it will contact the limit switch 222 (FIG. 30) to energize indicator light 335 to indicate the seat is up. The press cylinders 57 will then be extended by opening the valve 263 to pressurize the blind ends of such cylinders to drive the respective press plates 53 (FIG. 9) toward one another to engage the holding cushions 51 with the opposite edges of the seats 73 and 75 to lock them in position, concurrently contacting level switch 222 to actuate the seat up high 335 (FIG. 27).

It will appreciated that the unlocking and release of the wheelchair is relatively convenient, straight forward and rapid thus minimizing any intervention by the driver and giving the wheelchair occupant some degree of independence. Again, the rapid release and exit of the wheelchair will minimize the exit maneuver thus minimizing any delay in the schedule. As it will be recognized by those of skill in the art the embodiment of the inventions exemplified above is but one of many different forms that will occur to those working in the art. As other examples, the holders and drivers may be independent or combined together, the drivers may be mechanical, hydraulic, electric or any other acceptable form, the controls may be manual, mechanical, electrical mechanical, air actuated or any other convenient form desirable for carrying out the present invention.

In the event the transit vehicle should be in any emergency while the wheelchair is constrained, it will be appreciated that the occupant can quickly raise the cover 227 (FIG. 23) to have access to the emergency pull handle 231 and pull such handle open the vent valve 251 to vent pressure from the system thereby releasing a drive cylinders 57 to release the presses and also relieving pressure on the drive cylinder 221 for the arm 201 so it can be easily raised. Thus, the wheelchair occupant has some degree of freedom to free him or herself in the event of an emergency.

From the foregoing it would be appreciated that the wheelchair docking assembly and system in the present invention provides a convenient, reliable and rapidly operable system for constraining a wheelchair on position on a transport vehicle by minimizing intervention by the vehicle driver or operator.

I claim:

1. A transport vehicle including a floor having a chair docking area for receipt of a wheelchair carried on wheels with respective laterally outwardly facing wheel surfaces comprising:

a pair of press devices mounted on opposite sides of the docking area, including respective holding cushions with respective laterally inwardly facing cushion surfaces to engage opposite sides of a wheelchair located in the docking area and constructed to, upon application of a predetermined force, conform to the respective wheel surfaces of the wheels;

at least one of the press devices being movable laterally from a retracted position to a constraining position; and a drive coupled with the at least one of the press devices operable to drive the at least one of the press devices to the constraining position with the predetermined force.

2. A transport vehicle as set forth in claim 1 wherein:

the respective holding cushions include bladders.

3. The transport vehicle of claim 1 wherein:

the press devices include respective backing plates with respective vertical cross square sections of about 30 inches on a side; and the holding cushions are constructed to cover substantially an entire surface of the backing plates.

4. The transport vehicle as set forth in claim 1 wherein:

the press devices include respective backing plates disposed in respective vertical planes and constructed with a vertical and horizontal dimension of at least 10 inches; and the holding cushions are constructed to cover substantially an entire surface of the respective backing plates.

5. The transport vehicle of claim 1 wherein:

the press devices include respective backing plates disposed in respective vertical planes and having a vertical dimension of at least 10 inches; and the holding cushions are constructed with a plurality of horizontal projection defining knobs projecting laterally inwardly to, when the at least one press device is in its constraining position, project through any aligned openings in the respective wheel surfaces.

6. The transport vehicle of claim 1 wherein:

the press devices include respective backing plates disposed in respective vertical planes and formed with vertical dimensions of at least 10 inches; and the holding cushions are constructed to cover an entire vertical surface of the backing plates.

7. The transport of vehicle of claim 1 wherein:

the press devices are constructed with respective backing plates disposed in respective vertical planes and configured with horizontal dimensions of at least 10 inches; and the respective holding cushions are constructed to cover substantially entire horizontal dimension of the respective backing plates.

* * * * *